United States Patent [19]

Liedgens

[11] Patent Number: 5,653,326

[45] Date of Patent: Aug. 5, 1997

[54] YARN PACKAGE CONVEYOR SYSTEM WITH PACKAGE SHUNTING MEANS

[75] Inventor: Hans-Peter Liedgens, Mönchengladbach, Germany

[73] Assignee: W. Schlafhorst AG & Co., Muenchengladbach, Germany

[21] Appl. No.: 561,458

[22] Filed: Nov. 21, 1995

[30] Foreign Application Priority Data

Nov. 25, 1994 [DE] Germany .................... 44 41 964.3

[51] Int. Cl.$^6$ .................................................. B65G 47/46
[52] U.S. Cl. ................ 198/370.04; 198/598; 198/370.03
[58] Field of Search ........................ 198/369.3, 370.03, 198/370.04, 809, 456, 597, 598

[56] References Cited

U.S. PATENT DOCUMENTS

| | | |
|---|---|---|
| 2,833,390 | 5/1958 | Greulich . |
| 3,038,584 | 6/1962 | Lagsdin . |
| 4,461,378 | 7/1984 | Roth ............................. 198/370.04 |
| 4,961,489 | 10/1990 | Warkentin ...................... 198/370.04 |
| 5,056,655 | 10/1991 | Justice . |

FOREIGN PATENT DOCUMENTS

| | | |
|---|---|---|
| 925100 | 2/1955 | Germany . |
| 2249124B2 | 8/1981 | Germany . |
| 2449675C2 | 11/1983 | Germany . |
| 2755102C2 | 7/1984 | Germany . |
| 24461B | 4/1987 | Germany . |
| 2825184C2 | 8/1987 | Germany . |
| 3712378A1 | 10/1988 | Germany . |
| 4222723A1 | 1/1994 | Germany . |
| 4403594.2 | 2/1994 | Germany . |
| 46-6272 | 3/1971 | Japan . |
| 2-28414 | 1/1990 | Japan . |
| 9315986 | 8/1993 | WIPO ............................. 198/370.03 |

*Primary Examiner*—James R. Bidwell
*Attorney, Agent, or Firm*—Shefte, Pinckney & Sawyer

[57] ABSTRACT

A conveyor system for transferring yarn packages or other yarn packages from one conveyor belt to another downstream located conveyor belt traveling in the same conveying direction and at the same speed. The conveyor belts are guided on support structures which are embodied as lateral guide elements which are height-adjustable in a selected area. The lateral guide elements are connected by a linkage such that, when the inward guide elements are lowered, the outward guide elements are simultaneously raised, thereby to cause yarn packages to gravitationally roll from the first belt to the other belt.

7 Claims, 3 Drawing Sheets

YARN PACKAGE CONVEYOR SYSTEM WITH PACKAGE SHUNTING MEANS

FIELD OF THE INVENTION

The present invention relates to a device for transferring yarn packages such as bobbins and cheeses, supplied by an endless conveying means, to a downstream located endless conveying device.

BACKGROUND OF THE INVENTION

In textile factories, textile machines which produce cheeses and like yarn packages, such as automatic cheese winders, open-end spinning frames, etc., customarily transfer the packages produced in the winding department or the spinning mill to downstream located departments via automatic bobbin conveying systems.

For example, a conveying system is known from German Patent Disclosure DE 37 12 378 A1, wherein the bobbins produced by a number of spinning machines are delivered to another department of the factory, for example the packaging and shipping department. Among other things, the conveying system utilizes a belt conveyor and a storage device for storing the yarn bobbins conveyed by means of the conveyor belt. The yarn bobbins are conveyed on the conveyor belt in a timed intermittent stepwise manner to the storage device where they are pushed from the conveyor belt onto the intended storage track by a pusher device. However, because of the intermittent stepwise operation there are limits to the conveying capacity of the conveying system. In addition, there is the danger that the yarn bobbins may be damaged by the intermittent stepwise operation and the pusher device provided.

Furthermore, a device is known from German Patent Disclosure DE 42 22 723 A1, which permits the continuous transfer of packages which are in intermediate storage, for example on storage belts disposed parallel to each other, to a downstream located conveying means disposed orthogonally in respect to the storage belts. The transfer device here essentially consists of a cam conveyor displaceably guided on the downstream located conveying means, which can be selectively coupled with the individual storage belts.

A later-published German application P 44 03 594.2 describes a conveying device with an endless conveying means, which consists of a plurality of chain links with support surfaces for the packages on the top. In this case, the chain links of this conveying chain train are connected with each other such that movement in at least two directions is possible between two adjoining chain links. The resultant movability of the chain links makes it possible to employ the endless conveying means in a wide variety of embodiments. For example, the endless conveying means can be employed as a continuous conveyor arranged in a helical conveying path to connect bobbin conveying means which are disposed on conveying levels of different height. In another embodiment, a continuous bobbin transfer between two or more parallel extending conveying means is provided. For bobbin transfer, lateral guide shoulders of the conveying run of the conveying means delivering bobbins are guided over liftable connecting links of the chain guide profile and in this way the support surfaces of the chain links are tilted such that the packages roll laterally off the support surfaces of this conveying means and are transferred to a second conveying means of essentially the same design moving in parallel along the first conveying means.

Conveying systems which can be unloaded by lifting the sides of the traveling conveying means are also basically known from German Patent Disclosure DE 24 49 675 C2 and the Japanese Utility Model Application 46-6272.

SUMMARY OF THE INVENTION

It is accordingly an object of the present invention to further improve textile bobbin, cheese and like yarn package conveying devices of the above-described type.

Briefly summarized, the foregoing objective is achieved in the present invention in a conveyor system for transporting textile yarn packages utilizing first and second conveyor belts traveling side by side, typically in the same direction and at approximately the same speed, by providing a conveyor belt support structure having a belt guide means disposed laterally of at least the first conveyor belt at a selected lengthwise area therealong, and package shunting means for selectively adjusting the height of the lateral guide means for transferring yarn packages from the first conveyor to the second conveyor belt.

In the preferred embodiment, the belt guide means comprises laterally outward and inward guide elements at opposite lateral sides of each of the first and second conveyor belts, with the package shunting means being arranged to simultaneously raise each outward guide element and lower each inward guide element. Preferably, the package shunting means comprises a linkage arrangement for operatively connecting the outward and inward guide elements with one another, thereby to accomplish simultaneous lowering of the inward guide elements and raising of the outward guide elements. The linkage arrangement comprises a central structural element connected to each of the inward guide elements and pivot levers connected respectively to the central structural element and to the outward guide elements.

It is also preferred that the package shunting means comprises a drive means connected to the linkage arrangement for actuating raising and lowering movements of the lateral guide elements. The package shunting means may additionally be equipped with package retaining panels adjacent the guide elements.

The described embodiment according to the invention has the advantage that, on the one hand, low-cost conveyor belt systems which have been proven in practical use are employed as conveying means for the packages and, on the other hand, a continuous gentle package transfer from one conveyor belt system to another conveyor belt system is assured. In accordance with the invention, the support structures of the conveyor belt system are modified in a selected area such that the otherwise rigid lateral guides for the conveyor belts can be adjusted in height in a defined manner by means of a suitable drive arrangement, for example by means of a pneumatic cylinder.

Preferably, at least the inwardly disposed lateral guide elements of the support structures, which are disposed in close parallel adjacency to each other in a selected area, can be lowered together. It is preferred that such inwardly disposed, mutually lowerable lateral guide elements are functionally connected with the spaced-apart, outwardly disposed lateral guide elements such that, when the inward lateral guide elements are lowered, the outward lateral guide elements are simultaneously raised. A package shunt is created in this way which, on the one hand, allows a continuous transfer of packages from one conveyor belt system to a downstream located conveyor belt system and, on the other hand, assures gentle treatment of the packages during transfer.

According to a further aspect of the invention, the inwardly disposed lateral guide elements are a part of a central structural element which is connected via pivot levers with the outwardly disposed lateral guide elements. The central structural element is height-adjustable by means of a controllable drive, for example a pneumatic cylinder or the like. Thus, the central structural element can be lowered in a defined manner and in the process simultaneously lifts the outwardly disposed lateral guide elements by means of the pivot levers. The raised outward lateral guide element of the yarn package-conveying belt system causes the traveling conveyor belt to be lifted on one side in the area of the yarn package shunt in the manner of an inclined plane. This inclined plane permits the packages to roll off gravitationally in the direction of the downstream located conveyor belt system which is disposed parallel and travels in the same direction and at the same speed. In the process the lowered inward lateral guide elements assure that the transfer of packages from one conveyor belt to the other conveyor belt takes place continuously and gently. The raised lateral guide element of the accepting conveyor belt in addition assures that the packages cannot roll past this conveyor belt.

Further details of the invention can be found in an exemplary embodiment represented by means of the drawings below.

DETAILED DESCRIPTION OF THE PREFERRED EMBODIMENT

Figure 1:
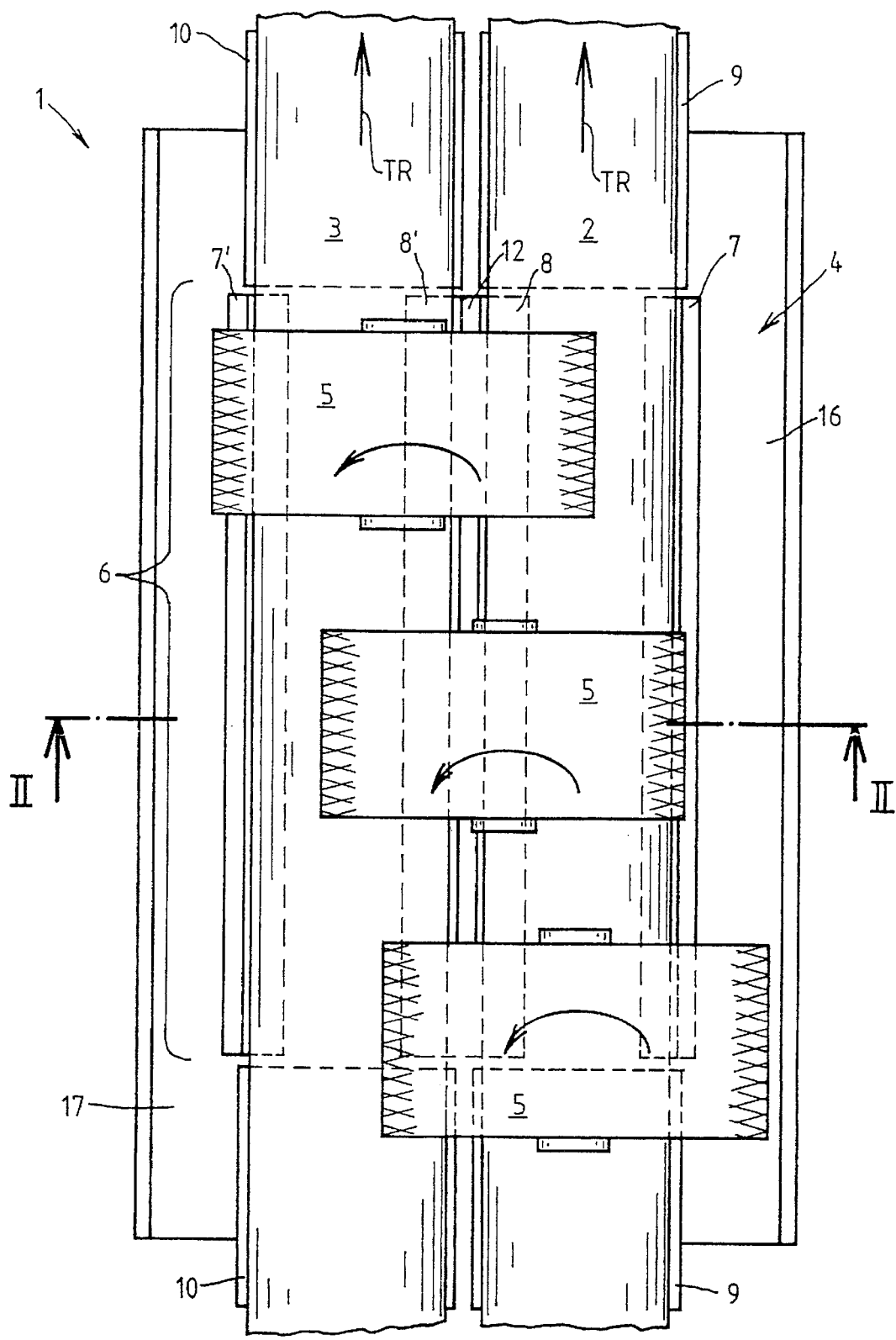
FIG. 1 is a schematic top plan view of the yarn package shunt in accordance with the present invention.

As best seen schematically in a top plan view in FIG. 1, the device in accordance with a preferred embodiment of the present invention is particularly adapted for transferring yarn packages 5 being transported by one endless conveying means 2 to a downstream located conveying means 3.

The conveying system, identified by 1 in its entirety, comprises the two conveyor belts 2,3, which are arranged parallel with each other and are driven by suitable means (not shown) to travel in the same transport direction TR. The respective conveyor belts 2,3 are guided on support structures 9 and 10 and travel at approximately the same conveying speed. The support structures 9 and 10 have raised lateral guides which cause the conveyor belts 2,3 to be deformed in the manner of a trough (see FIG. 3). The trough-like formation of the conveyor belts assure a secure guidance and constraint of the yarn packages 5 being conveyed against undesired lateral movement on the belts.

In a selected lengthwise area 6 along the conveyor path, the support structures 9,10 have been modified such that they form a yarn package shunt, generally indicated at 4. Specifically, in this selected area the support structures 9,10 have lateral guide elements 7,7' and 8,8' (see also FIGS. 2 and 3) which are height-adjustable in a controlled and related manner.

Figure 2:
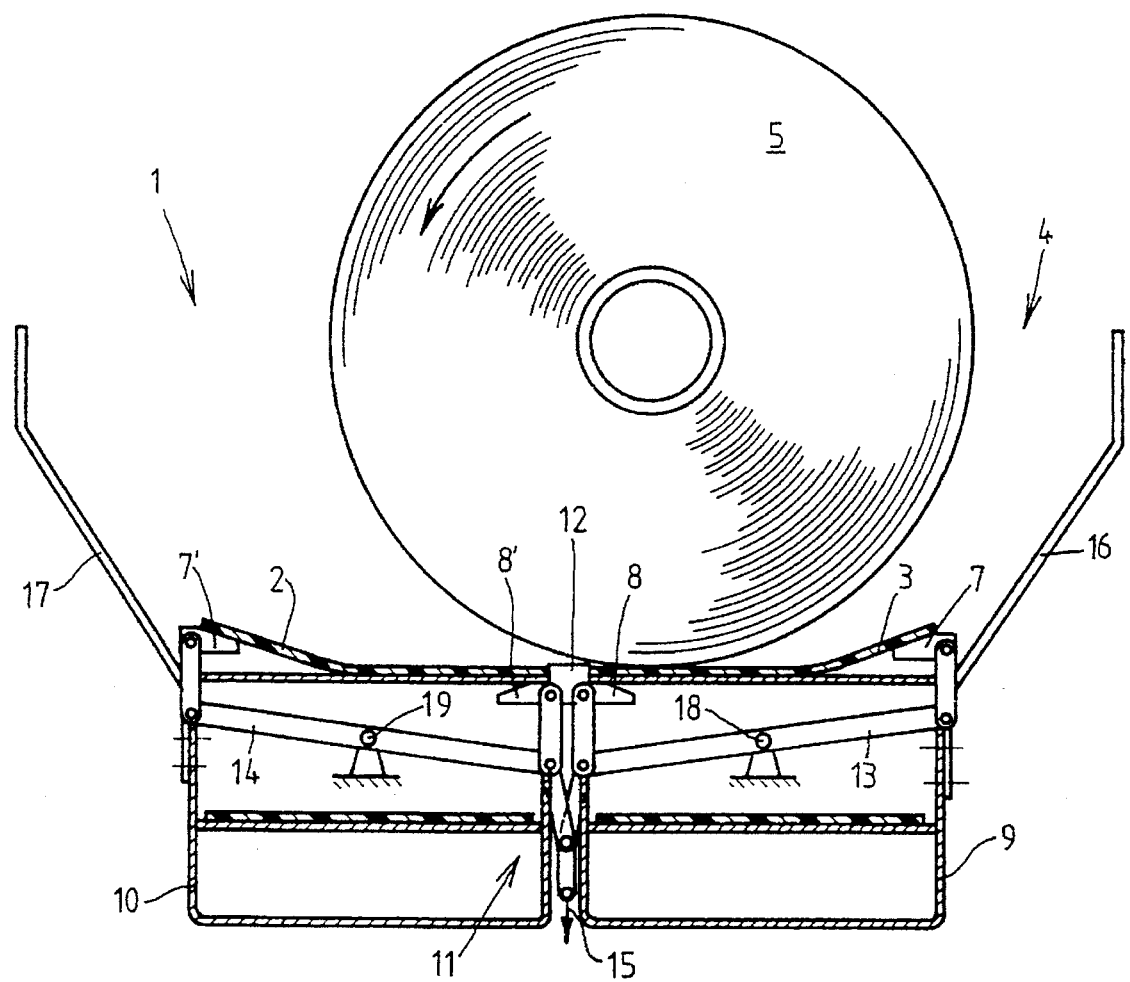
FIG. 2 is a lateral cross-sectional view of the yarn package shunt in accordance with the present invention, taken along the section line II—II in FIG. 1, showing the shunt in its operative condition.
Figure 3:
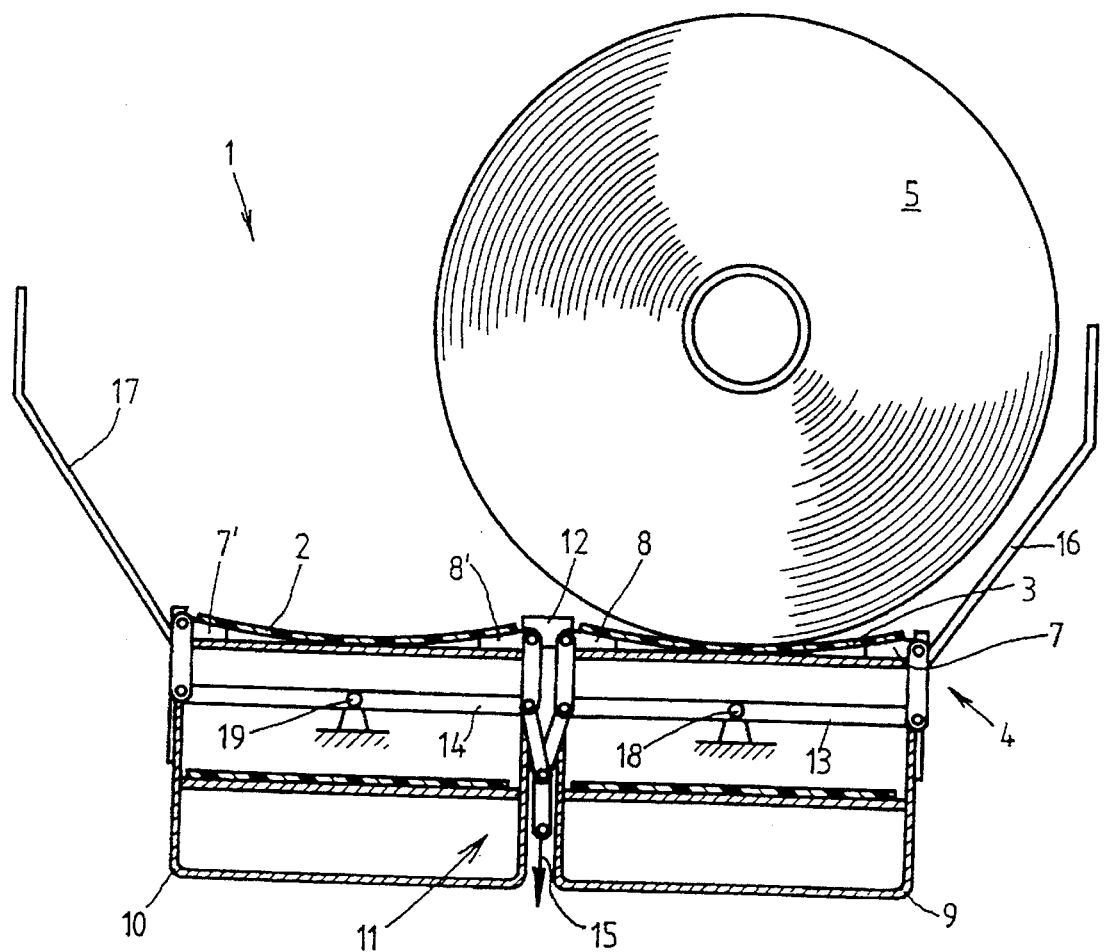
FIG. 3 is another lateral cross-sectional view similar to FIG. 2, showing the yarn package shunt of the present invention in its neutral position.

As shown in particular in FIGS. 2 and 3, each of the inwardly disposed lateral guide elements 8,8' is connected via a linkage arrangement 11 with the respectively associated outwardly disposed lateral guide element 7,7' such that, when the inward lateral guide elements 8,8' are lowered, the outward lateral guide element 7,7' are simultaneously raised to a related degree. In this embodiment, the linkage arrangement essentially consists of pivot levers 13,14 rotatably seated in pivot shafts 18,19. A drive 15 is hinged to the respective inward ends of the pivot levers 13,14, to provide actuation control for raising and lowering of the lateral guide elements 7,7',8,8' in a defined manner. However, it is also conceivable that the drive 15 can be arranged to act directly on the inward lateral guide elements 8,8'. In a preferred embodiment the lateral guide elements 8,8' are a part of the central structural element 12.

It is additionally possible to install lateral sheet metal panels 16,17 in the area of the yarn package shunt 4. However, these lateral sheet metal panels only represent a cautionary step to prevent the yarn packages from rolling off the conveyor belts in exceptional situations. These lateral sheet metal panels are not used in normal operation of the conveyor system and are therefore not absolutely necessary for the functioning of the package shunt 4 in accordance with the invention.

The operation of the present device may thus be understood. As indicated in FIG. 1, yarn packages 5 are conveyed by means of the conveyor belt 2 into the selected shunt area 6 of the conveying system 1, wherein the conveying system 1 is equipped with the aforedescribed package shunt 4, i.e., the support structures 9,10 of the conveyor belt systems have the height-adjustable lateral guide elements 7,7' and 8,8', which can be placed in different operating positions by means of the linkage arrangement 11 and the drive 15.

A representative situation is shown in FIG. 3, wherein the lateral guide elements 7,7' and 8,8' are in a neutral position, i.e. for normal transport of packages or yarn packages 5. In particular, the outward lateral guide elements 7,7' as well as the inward guides 8,8', disposed on a central structural element 12, are in a centered disposition wherein the lateral edges of the conveyor belts 2, 3 are slightly raised on both sides to slightly deform the belts 2,3 into a trough-like shape, so that the yarn packages 5 being transported are securely retained on the trough-shaped inverted conveyor belt 2. When the package shunt 4 is in the neutral position indicated in FIG. 3, the yarn packages 5 are transported through and past the package shunt 4 without being diverted from the conveyor belt 2 in the direction toward the conveyor belt 3.

FIG. 2 shows the package shunt 4 in its transfer position wherein the inward lateral guide elements 8,8' are lowered via the drive 15 and, in turn, the outward lateral guide elements 7,7' are simultaneously extended upwardly via the pivot levers 13,14. In this manner, the outward lengthwise edge of the conveyor belt 2 (i.e. its right edge as viewed in the conveying direction TR in FIG. 2) and the outward lengthwise left edge of the belt 3 are raised above their normal height over the length of the shunt area 6 and, simultaneously, the inward lateral guide elements 8,8' are lowered sufficiently so that a continuous flat surface is created between the conveyor belts 2 and 3. When the yarn packages 5 being delivered by the traveling conveyor belt 2 reach the shunt area 6, they are necessarily deflected laterally from the conveyor belt 2 by its raised lateral portion in the direction of the conveyor belt 3 causing the yarn packages 5 to roll gravitationally from the conveyor belt 2 onto the parallel conveyor belt 3. In the process, the corresponding laterally outward lengthwise extent of the conveyor belt 3 raised under the effect of the associated raised guide element 7' prevents the yarn packages 5 received from the conveyor belt 2 from rolling off the conveyor belt 3. The transfer of the yarn packages 5 from one conveying means to the other conveying means takes place continuously and extremely gently.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A conveyor system for transporting textile yarn packages comprising: first and second conveyor belts traveling side by side, a conveyor belt support structure having a belt guide means disposed laterally of the first and second conveyor belts at a selected lengthwise area therealong, the belt guide means comprising laterally outward and inward guide elements at opposite lateral sides of the first conveyor belt and laterally outward and inward guide elements at opposite lateral sides of the second conveyor belt, and package shunting means for selectively adjusting the height of the belt guide means for transferring yarn packages from the first conveyor belt to the second conveyor belt, the package shunting means being arranged to simultaneously raise each outward guide element and lower each inward guide element.

2. A conveyor system in accordance with claim 1, wherein the package shunting means comprises means for operatively connecting the outward and inward guide elements with one another.

3. A conveyor system in accordance with claim 1, wherein the connecting means comprises a linkage arrangement for simultaneously lowering the inward guide elements and raising the outward guide elements.

4. A conveyor system in accordance with claim 1, wherein the linkage arrangement comprises a central structural element connected to each of the inward guide elements and pivot levers connected respectively to the central structural element and to the outward guide elements.

5. A conveyor system in accordance with claim 1, wherein the package shunting means comprises drive means connected to the linkage arrangement for actuating raising and lowering movements of the lateral guide elements.

6. A conveyor system in accordance with claim 1, wherein the package shunting means comprises package retaining panels adjacent the guide elements.

7. A conveyor system in accordance with claim 1, wherein the conveyor belts travel in the same direction and at approximately the same speed.

* * * * *